(12) United States Patent
Rochholz

(10) Patent No.: US 7,832,985 B2
(45) Date of Patent: Nov. 16, 2010

(54) ROTOR BLADE AND WIND ENERGY PLANT

(75) Inventor: Hermann Rochholz, Norderstedt (DE)

(73) Assignee: Nordex Energy GmbH, Norderstedt (DE)

( * ) Notice: Subject to any disclaimer, the term of this patent is extended or adjusted under 35 U.S.C. 154(b) by 700 days.

(21) Appl. No.: 11/775,975

(22) Filed: Jul. 11, 2007

(65) Prior Publication Data

US 2008/0112813 A1    May 15, 2008

(30) Foreign Application Priority Data

Nov. 15, 2006   (DE) .................. 10 2006 053 712

(51) Int. Cl.
*F03D 11/00*    (2006.01)
(52) U.S. Cl. .............. 416/10; 416/202; 416/223 R; 416/237; 416/239; 415/4.3; 415/4.5; 415/908
(58) Field of Classification Search ............ 416/10, 416/11, 9, 202, 228, 235, 237, 238, 223 R, 416/240; 415/4.3, 4.5, 908
See application file for complete search history.

(56) References Cited

U.S. PATENT DOCUMENTS

| | | | |
|---|---|---|---|
| 217,067 A * | 7/1879 | Cowdery | 416/10 |
| 2,451,106 A * | 10/1948 | Martin | 416/238 |
| 4,533,297 A | 8/1985 | Bassett | |
| 6,116,857 A * | 9/2000 | Splettstoesser et al. | 416/228 |
| 6,582,196 B1 * | 6/2003 | Andersen et al. | 416/202 |
| 7,344,360 B2 * | 3/2008 | Wetzel | 416/238 |

FOREIGN PATENT DOCUMENTS

| | | |
|---|---|---|
| DE | 296 12 720 U1 | 11/1996 |
| DE | 298 80 145 U1 | 4/2000 |
| DE | 201 20 324 U1 | 10/2002 |
| DE | 10 2004 023 774 A | 12/2005 |
| DE | 102 01 726 A1 | 4/2010 |

* cited by examiner

*Primary Examiner*—Igor Kershteyn
(74) *Attorney, Agent, or Firm*—Vidas Arrett & Steinkraus, P.A.

(57) ABSTRACT

The present invention is related to a rotor blade for a wind energy plant, with a blade root, with a first longitudinal portion starting from the blade root, with a second longitudinal portion, following up the first longitudinal portion and running into a blade tip, with a first surface, facing a tower of the wind energy plant in its assembled state, and a second surface, facing away from the tower of the wind energy plant in its assembled state, wherein an imaginary reference plane is spanned up by a rotation, taking place in the operation of the rotor blade, of the longitudinal axis of the first longitudinal portion around the rotational axis of a rotor of the wind energy plant carrying the rotor blade which prevents collisions of the blade tip with the tower of the wind energy plant.

11 Claims, 3 Drawing Sheets

ROTOR BLADE AND WIND ENERGY PLANT

CROSS-REFERENCE TO RELATED APPLICATIONS

Not applicable.

STATEMENT REGARDING FEDERALLY SPONSORED RESEARCH

Not applicable.

BACKGROUND OF THE INVENTION

The present invention is related to a rotor blade for a wind energy plant, with a blade root, with a first longitudinal portion starting from the blade root, with a second longitudinal portion, following up the first longitudinal portion and running into a blade tip, with a first surface, facing a tower of the wind energy plant in its assembled state, and a second surface, facing away from the tower of the wind energy plant in its assembled state, wherein an imaginary reference plane is spanned up by a rotation of the longitudinal axis of the first longitudinal portion around the rotational axis of a rotor of the wind energy plant carrying the rotor blade, which takes place in the operation of the rotor blade.

In addition, the present invention is related to a wind energy plant with a tower and a nacelle provided on the upper end of the tower, with a rotor, rotatably mounted around a rotational axis and having at least one rotor hub.

Rotor blades of modern wind energy plants have a considerable dimension, so that blades with a weight as small as possible are preferred in order to secure sufficient stability of the plant. This requirement has the result that the rotor blades have an elasticity which can lead to bending of the rotor blades in the operation of the plant, depending on the strength of the attacking wind.

In so-called front runner plants in particular, in which the wind meets first the rotor blades and then the tower of the plant, it has to be guaranteed even at bent rotor blades that the distance between blade tip and tower is sufficient. In order to make this sure, the distance between the rotor carrying the blades and the tower can be increased. Thus, the distance between the blade tips and the tower, the so-called tower freeway, is increased. This measure has several disadvantages, which make a correspondingly elaborate dimensioning of rotor and plant necessary.

For solving this problem, it is known from DE 298 80 145 U1, the entire contents of which is incorporated herein by reference, to form the rotor blades such that from the rotor hub towards the outside, they extend in a normal plane at first, and then, in a distance from the hub, in a curved manner, directed towards the outside and towards the front. As a result, this curved construction may be accompanied with cost-saving, because less stiffness is needed. Through this geometry of the rotor blades, a collision of the blade tips with the tower is to be safely avoided even in a strong wind, the rotor blades bending back to a straight course when they are loaded, but never coming too near to the tower. In this, the curvature of the rotor blades is provided in the outer region for aesthetic reasons, along the outer third of the blades, for instance.

From DE 201 20 324 U1, the entire contents of which is incorporated herein by reference, a rotor blade is known in which in the nonloaded state, the distance from the blade axis of those points of the blade bottom side pointing farthest towards upwind in the operation is at least as great as on the blade root on each position of the rotor blade. While the side of this rotor blade facing away from the tower in the operation is formed essentially straight, the side facing the tower in the operation has a curvature. Through this shape, a collision with the tower is to be excluded even at an extreme bending of the rotor blade due to wind.

Finally, in DE 10 2004 023 774 A1, the entire contents of which is incorporated herein by reference, a rotor blade is proposed which is disposed on the rotor hub aligned in an obtuse angle to the rotor rotational axis, tilted away from the tower (cone angle), and which is formed curved with respect to the longitudinal axis in at least one length portion. Through the combination of these two measures the disadvantages accompanied with the single use of the respective measures alone are to be avoided and a collision of the blade tips with the plant tower is to be excluded even in a strong wind. In the known rotor blade, the region of the blade tip can be formed straight again, after a region of curvature.

The rotor blades and wind energy plants known in the state of the art have the common disadvantage that due to the respective rotor blade geometry, the contour on the aerodynamically important suction surface of the blade (the side pointing towards the tower in front runners) can be formed accurately only with difficulty. This results in a reduced efficiency of the plants. In addition, in the rotor blades and wind energy plants known since a long time, high moments act around the blade longitudinal axis in the operation, and thus on the bearing of a possibly provided blade pitch control (compare DE 201 20 324 U1).

The present invention is based on the objective to provide a rotor blade and a wind energy plant of the kind mentioned in the beginning, which have an augmented efficiency and safely avoid collisions of the blade tip with the tower of the wind energy plant even in strong winds, and in which the moments around the longitudinal axis of the blade occurring in the operation are reduced.

BRIEF SUMMARY OF THE INVENTION

According to the present invention, the first surface of the rotor blade in the region of a second longitudinal portion runs along an imaginary cone plane, which is spanned up by a rotation, taking place in the operation, of the first surface in the region of the second longitudinal portion around the rotational axis of a rotor carrying the rotor blade, wherein the cone plane intersects the reference plane in an angle. According to the present invention, the distance between the first surface and the reference plane along the second longitudinal portion increases linearly in the direction towards the blade tip, wherein the second longitudinal portion is longer than the first longitudinal portion.

For the wind energy plant indicated in the beginning, the objective is resolved in that at least one rotor blade according to the present invention is arranged on the rotor hub.

In front runners, the first surface of the rotor blade facing the tower is also designated as the suction surface, the second side facing away from the tower as the pressure side.

In that the cone plane spanned up by a rotation of the rotor blade in the region of the second longitudinal portion intersects the reference plane in an angle, according to the present invention, the second longitudinal portion is deflected from the first longitudinal portion, away from the tower of the plant. The profile of the surface facing the tower snuggles to an imaginary, linearly running tangential plane. In this, the distance between the first surface facing the tower and the reference plane increases linearly in the direction towards the blade tip along the second longitudinal portion, i.e. in contrast to the known curved rotor blades, the first surface runs linear in the deflected region. Finally, the second longitudinal portion is longer than the first longitudinal portion, so that the greater part of the surface of the rotor blade facing the tower has a distance linearly increasing with respect to the reference plane and with it to the tower.

Through the realisation of the rotor blade according to the present invention with a linearly deflected region of the first surface across the greater part of the longitudinal extension of the rotor blade, the aerodynamically important suction surface contour facing the tower of the plant can be built exactly according to the requirements with respect to the efficiency of the plant on the one hand. Thus, the efficiency of the plant can be improved compared to the known plants with curved blades or blades linearly deflected only across a small extension, respectively. In addition, through the realisation according to the present invention of an extensively linear first surface, it is possible to select the cone plane such that the pitch moments of the rotor blades acting on a blade pitch control are reduced. Through this, a blade pitch control is exposed to smaller forces, and accordingly it can be made less elaborate.

At the same time, due to the pre-inflexion of the rotor blade in the second longitudinal portion, it is made sure that the rotor blade tip cannot collide with the tower even when there is a bending in the direction of the tower taking place due to a very strong wind load.

According to the present invention, the distance between the first surface and the reference plane is measured in a direction pointing away from the tower of the wind energy plant when starting from the reference plane, so that the first surface may absolutely have a negative distance from the reference plane in the region near to the first longitudinal portion, which then increases linearly up to zero and then towards positive values.

Of course, in the rotor blade according to the present invention, the second surface facing away from the tower can have a distance with respect to the reference plane increasing in the direction to the blade tip. The same may increase linearly, but preferably it increases in a curved manner.

In principle, the present invention can be applied to all kinds of rotor hubs. Preferably, an upwind runner serves as the wind energy plant.

According to a preferred embodiment of the invention, the angle about which the cone plane intersects the reference plane is an acute angle. This construction takes into account the centrifugal forces. This realisation permits a transportation of the rotor blades without problems.

According to a further embodiment of the invention, the length of the second longitudinal portion can amount to more than 60% of the overall length of the rotor blade. With such a length of the second longitudinal portion, a good contour accuracy of the suction surface contour can be achieved, wherein the moments occurring around the longitudinal blade axis can be efficiently reduced at the same time.

In order to obtain a still more advantageous contour accuracy of the first surface and a still further going reduction of the moments around the longitudinal blade axis, the length of the second longitudinal portion can amount to about 75% of the overall length of the rotor blade. In this case, the length of the first longitudinal portion can amount to about 25% of the overall length of the rotor blade.

According to a further embodiment of the invention, the distance between the first surface and the reference plane can increase more in the region of the blade tip than in the region of the rest of the second longitudinal portion. Thus, it is possible to adapt the aerodynamically important blade tip to the respective operation demands in a particular way, for instance in order to minimise undesired air vortexes in the region of the blade tip. In this, the length of the blade tip can amount to about 5% of the overall length of the rotor blade. It forms a part of the second longitudinal portion.

In order to increase the tower freeway further without undesired side effects, the intersection line between the cone plane and the reference plane, seen in the longitudinal extension of the rotor blade, can be situated in the half of the rotor blade facing the blade root. Furthermore, the rotor blade can be adapted exactly to the aerodynamical requirements in this way.

In the rotor blade, the angle between the longitudinal axis of the first longitudinal portion and the rotational axis of a rotor carrying the rotor blade in the operation can amount to 90°. In this case, the first longitudinal portion describes no cone in a rotation around the rotational axis of the rotor in the operation, but a circular area. In the realisation of the rotor blade according to the present invention, this shape may be sufficient in many cases to achieve the required tower freeway. An additional cone of the first longitudinal portion is then not necessary. Furthermore, this realisation has the advantage that smaller forces are exerted on the rotor hub from the rotor blade than with an additional cone of the first longitudinal portion. The rotor hub and the nacelle can therefore be made less elaborate.

According to a further embodiment, in the wind energy plant according to the present invention, the rotational axis of the rotor can be in an angle with respect to the horizontal, as is per se known. In this case, the whole rotor with its rotor blades is tilted about an angle with respect to the horizontal. In this, the tilting takes place such that the rotor blades have a greater distance from the plane of the tower of the plant in their lower rotational position than in their upper rotational position.

Of course, depending on the operation demands, a realisation of the plant is also possible wherein there is no angle between the rotational axis of the rotor and the horizontal.

BRIEF DESCRIPTION OF THE SEVERAL VIEWS OF THE DRAWINGS

In the following, the invention is explained in more detail by means of a drawing depicting an example of its realisation.

DETAILED DESCRIPTION OF THE INVENTION

While this invention may be embodied in many different forms, there are described in detail herein a specific preferred embodiment of the invention. This description is an exemplification of the principles of the invention and is not intended to limit the invention to the particular embodiment illustrated In FIG. 1, a rotor blade 1 according to the present invention is depicted. The rotor blade 1 has a first longitudinal portion I starting from the blade root 1a and a second longitudinal portion II, following the first longitudinal portion I and running out into a blade tip 2. In the depicted example, the length of the first longitudinal portion I is about 20% of the overall length of the rotor blade 1, and the length of the second longitudinal portion II is about 80% of the overall length of the rotor blade 1. In this, the blade tip 2 occupies a length of about 5% of the overall length of the blade 1, and it is a part of the second longitudinal portion II.

The rotor blade 1 has a first surface S1, facing the tower of a wind energy plant in the operation, and a second surface S2, facing away from the tower in the operation. The longitudinal axis 3 of the first longitudinal portion I spans up a reference plane B in a rotation of the blade 1, taking place in the operation, around the rotational axis of a rotor carrying the blade 1, which is situated vertically to the plane of projection on the longitudinal axis 3 of the first longitudinal portion I.

Figure 1:
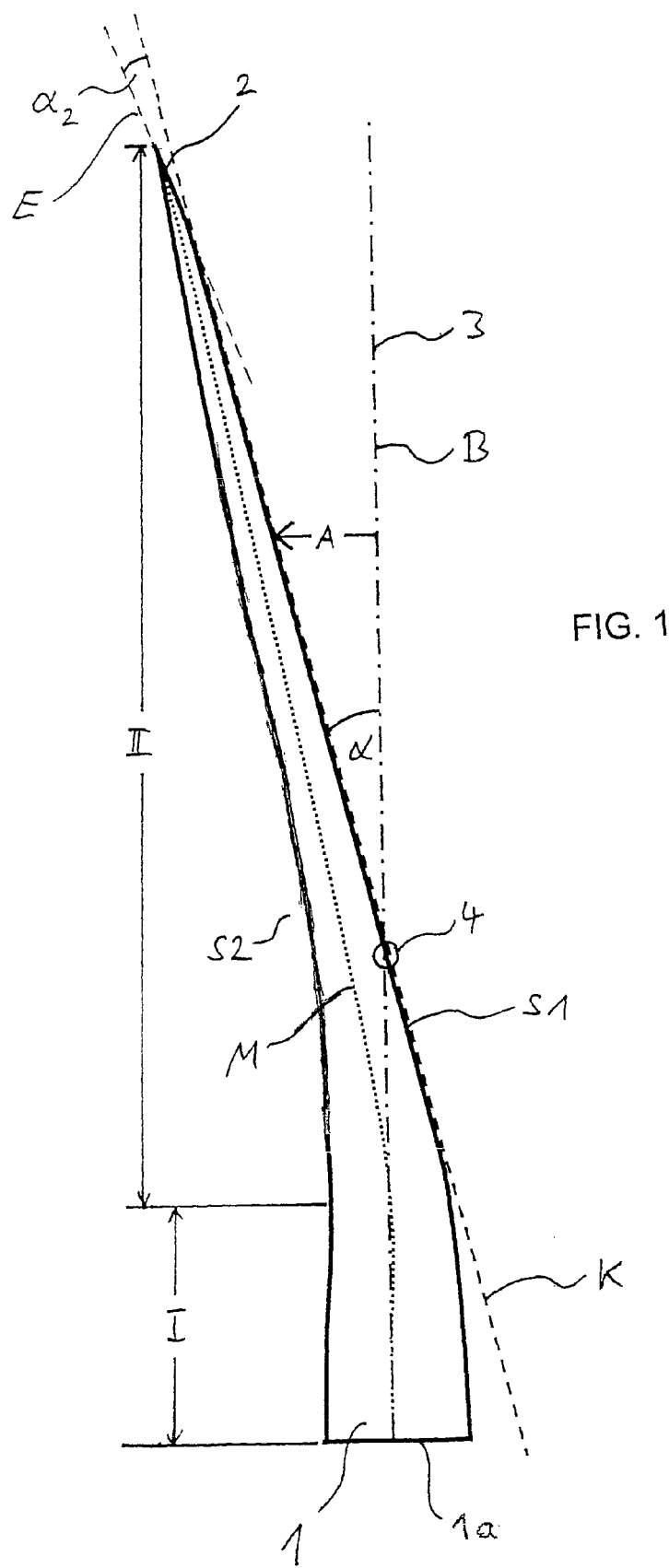
FIG. 1 shows schematically a view in a cross section of a rotor blade according to the present invention.

In a rotation of the blade 1 in the operation, the first surface I spans up a cone plane K in the region of the second longitudinal portion II, which is also situated vertically to the plane of projection in the depicted FIG. 1. The cone plane K intersects the reference plane B in an acute angle in an intersection line 4, which projects out of the plane of projection in the depicted example. In this, the intersection line 4 is situated in the half of the rotor blade 1 facing the blade root 1a, when seen in the longitudinal extension of the rotor blade 1.

The distance A between the first surface S1 and the reference plane B increases linearly in the direction of the blade tip 2 along the second longitudinal portion II. In this, the distance A is measured in a direction pointing away from the tower of the plant. Thus, the first surface S1 has a negative distance A to the reference plane B in the portion of the first longitudinal portion I directed to the blade root 1a when starting form the intersection line 4. In the direction of the blade tip 2, the distance A first increases linearly up to zero in the intersection line 4, and then to positive distance values above the intersection line 4.

In the region of the blade tip 2, the distance A between the first surface S1 of the rotor blade 1 and the reference plane B increases more than in the region of the rest of the second longitudinal portion II. In the depicted example of realisation, the distance A continues to increase linearly in the region of the tip 2. An imaginary plane E, put against the blade tip 2, intersects the cone plane K in an acute angle $\alpha 2$.

The contour central plane M of the rotor blade 1, which stands vertical to the plane of projection, is depicted in dotted lines in FIG. 1. The contour central plane M must not inevitably be situated on the side of the reference plane B facing away from the tower across the whole longitudinal extension of the rotor blade 1. It can also intersect the reference plane B and have a partial course on the side facing the tower of the reference plane B, in order to reduce the moments on the axis. In particular, this partial region can be present in the region of the first longitudinal portion I.

Figure 2:
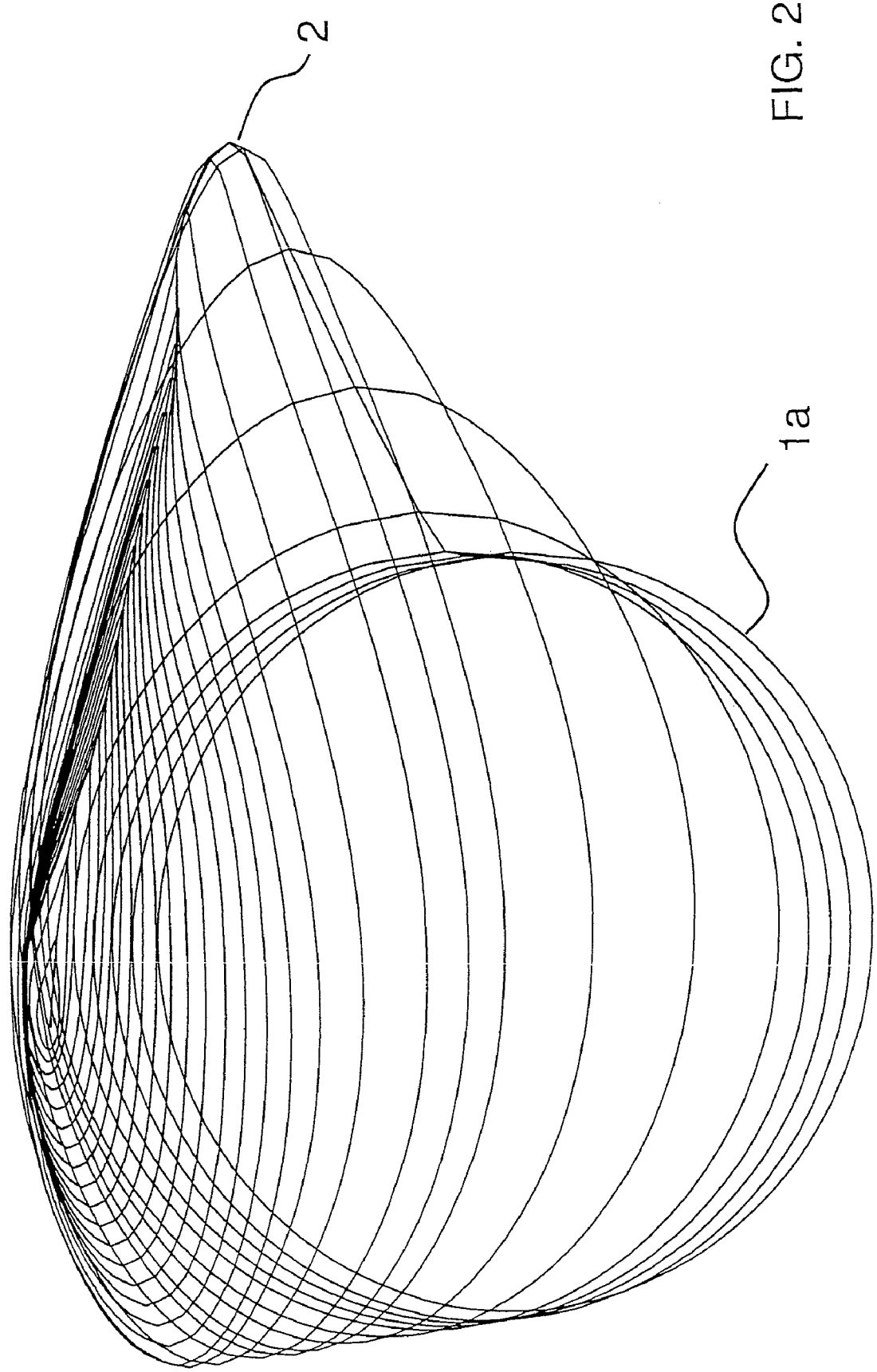
FIG. 2 shows schematically a profile geometry of the rotor blade after FIG. 1, by means of several cross-sections.

In FIG. 2, a profile geometry is depicted by means of cross sections through the rotor blade 1. A view vertical to the reference plane B is shown. In this, starting from the blade root 1a, the deflection of the second longitudinal portion II from the first longitudinal portion I and the run out of the second longitudinal portion II into the blade tip 2 can be recognised.

Due to its geometry, the rotor blade 1 according to the present invention ensures sufficient tower freeway even in a strong wind load of the blade 1 in the operation at any time. At the same time, the profile of the first surface S1 can be very well adapted to the aerodynamical requirements, so that an improved efficiency can be achieved by the rotor blade 1 according to the present invention. Furthermore, through the geometry according to the present invention, the occurrence of undesirably strong moments around the longitudinal blade axis can be avoided. This relieves a bearing of a blade pitch control.

Figure 3:
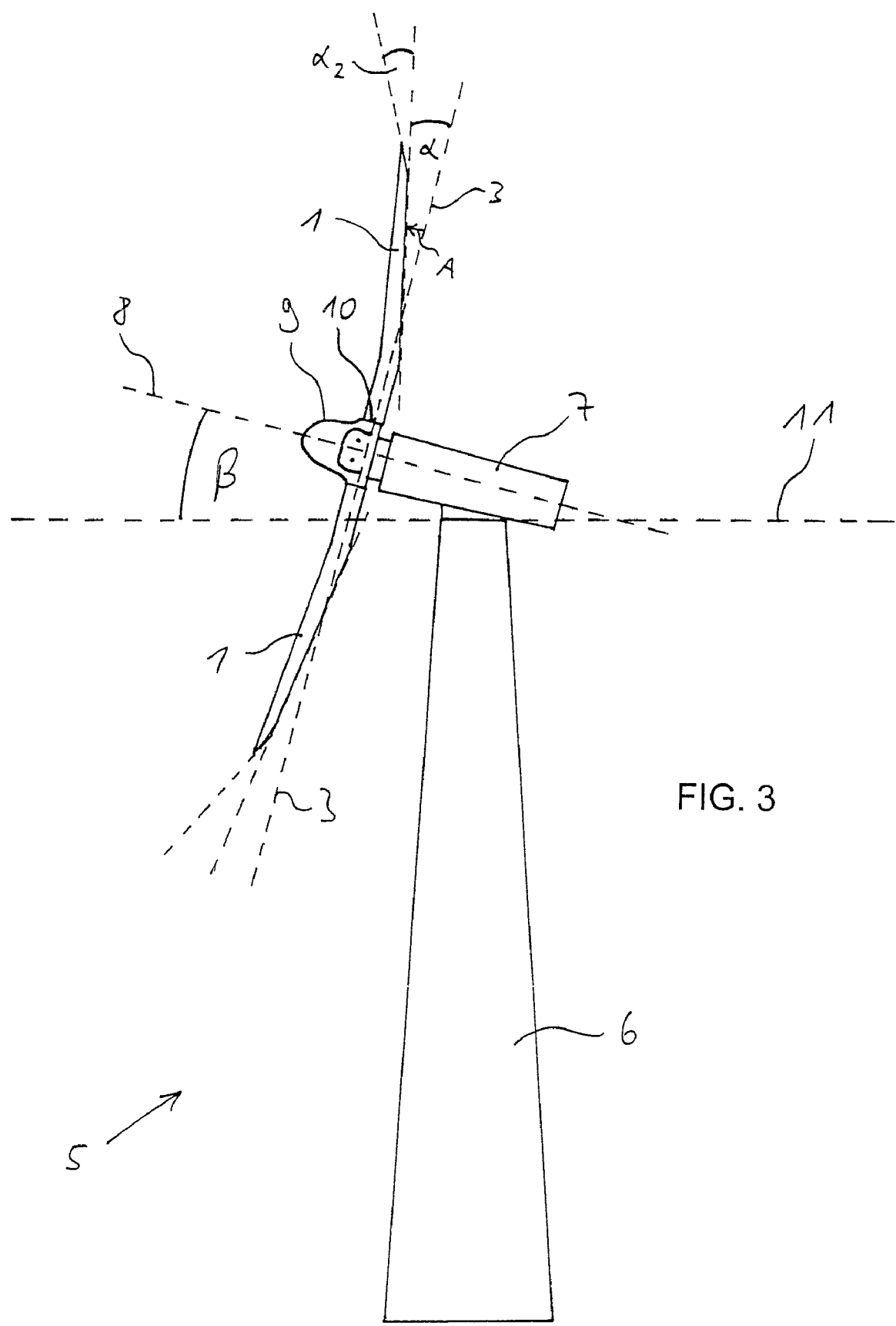
FIG. 3 shows schematically a view in a cross section of a wind energy plant according to the present invention.

In FIG. 3, a wind energy plant 5 according to the present invention is depicted. It has a tower 6, which carries a nacelle 7 on its upper end. On the nacelle 7, a rotor 9, rotatably mounted around its rotational axis 8, is provided. The rotor has a rotor hub 10, on which two of the rotor blades 1 depicted in FIG. 1 are fixed in the present example. A cone angle of the hub is not depicted. Same reference signs like in FIG. 1 designate same objects. The wind energy plant 5 according to the depicted example of realisation can furthermore be equipped with a blade pitch control, which is not depicted in more detail.

Between the longitudinal axes 3 of the first longitudinal portions I of the rotor blades 1 and the rotational axis 8 of the rotor 9, there is an angle of 90° at a time in the depicted example. Thus, the loads on the rotor and the nacelle in the operation are minimised. Furthermore, the rotational axis 8 of the rotor 9 has an angle $\beta$ with respect to the horizontal 11. Thus, the rotor blades 1 are deflected about the angle $\beta$ such that they have a greater distance from the tower 6 in their lower rotational position than in their upper rotational position. In this way, the angle $\alpha$ of the pre-shifting of the second longitudinal portion II can be selected to be smaller, through which the efficiency of the plant is increased.

It is indicated that the dimensions of the plant components and the magnitude of the respective angles shown in the figures are only depicted schematically, and in particular they are not a depiction correct in scale.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

What is claimed is:

1. A rotor blade (1) for a wind energy plant (5), with a blade root (1a), with a first longitudinal portion (I) starting from the blade root (1a), with a second longitudinal portion (II), following up the first longitudinal portion (I) and running into a blade tip (2), with a first surface (S1), facing a tower (6) of the wind energy plant (5) in the assembled state, and a second surface (S2), facing away from the tower (6) of the wind energy plant (5) in the assembled state, wherein an imaginary reference plane (B) is spanned up by a rotation, taking place in the operation of the rotor blade (1), of the longitudinal axis (3) of the first longitudinal portion (I) around the rotational axis (8) of a rotor (9) of the wind energy plant (5) carrying the rotor blade (1), characterized in that the first surface (S1) runs along an imaginary cone plane (K) in the region of the second longitudinal portion (II), which is spanned up by a rotation, taking place in the operation, of the first surface (S1) in the region of the second longitudinal portion (II) around the rotational axis (8) of a rotor (9) carrying the rotor blade (1), wherein the cone plane (K) intersects the reference plane (B) in an angle of ($\alpha$), the distance (A) between the first surface (S1) and the reference plane (B) increases linearly in the direction towards the blade tip (2) along the second longitudinal portion (II), and the second longitudinal portion (II) is longer than the first longitudinal portion (I).

2. A rotor blade according to claim 1, characterized in that the angle ($\alpha$) in which the cone plane (K) intersects the reference plane (B) is an acute angle.

3. A rotor blade according to claim 1, characterized in that the length of the second longitudinal portion (II) amounts to more than 60% of the overall length of the rotor blade (1).

4. A rotor blade according to claim 1, characterized in that the length of the second longitudinal portion (II) amounts to about 80% of the overall length of the rotor blade (1).

5. A rotor blade according to claim 4, characterized in that the length of the first longitudinal portion (I) amounts to about 20% of the overall length of the rotor blade (1).

6. A rotor blade according to claim 1, characterized in that the intersection line (4) between the cone plane (K) and the reference plane (B), seen in the longitudinal extension of the rotor blade (1), is situated in the half of the rotor blade (1) facing the blade root (1a).

7. A rotor blade (1) for a wind energy plant (5), with a blade root (la), with a first longitudinal portion (I) starting from the blade root (1a), with a second longitudinal portion (H), following up the first longitudinal portion (I) and running into a blade tip (2), with a first surface (S1), facing a tower (6) of the wind energy plant (5) in the assembled state, and a second surface (S2), facing away from the tower (6) of the wind energy plant (5) in the assembled state, wherein an imaging reference plane (B) is spanned up by a rotation, taking place in the operation of the rotor blade (1), of the longitudinal axis (3) of the first longitudinal portion (I) around the rotational axis (8) of a rotor 9 of the wind energy r blade 1 characterized in that the first surface (S1) runs along an imaginary cone plane (K) in the region of the second longitudinal portion (II), which is spanned up by a rotation, taking place in the operation, of the first surface (S1) in the region of the second longitudinal portion (II) around the rotational axis (8) of a rotor (9) carrying the rotor blade (1), wherein the cone plane (K) intersects the reference plane (B) in an angle of ($\alpha$), the distance (A) between the first surface (S1) and the reference plane (B) increases more in the region of the blade tip (2) than in the region of the rest of the second longitudinal portion (II)), and the second longitudinal portion (II) is longer than the first longitudinal portion (I).

8. A rotor blade according to claim 7, characterized in that the length of the blade tip (2) amounts to about 5% of the overall length of the rotor blade (1).

9. A rotor blade (1) for a wind energy plant (5), with a blade root (1a), with a first longitudinal portion (I) starting from the blade root (1a), with a second longitudinal portion (II), following up the first longitudinal portion (I) and running into a blade tip (2), with a first surface (S1), facing a tower (6) of the wind energy plant (5) in the assembled state, and a second surface (S2), facing away from the tower (6) of the wind energy plant (5) in the assembled state, wherein an imaginary reference plane (B) is spanned up by a rotation, taking place in the operation of the rotor blade (1), of the longitudinal axis (3) of the first longitudinal portion (I) around the rotational axis (8) of a rotor (9) of the wind energy plant (5) carrying the rotor blade (1), characterized in that first surface (S1)runs along an imaginary cone plane (K) in the region of the second longitudinal portion (II), which is spanned up by a rotation, taking place in the operation, of the first surface (S1) in the region of the second longitudinal portion (II) around the rotational axis (8) of a rotor (9) carrying the rotor blade (1), wherein the cone plane (K) intersects the reference plane (B) in an angle of ($\alpha$), the distance (A) between the first surface (S1) and the reference plane (B) increases linearly in the direction towards the blade tip (2) along the second longitudinal portion (II), and the second longitudinal portion (II) is longer than the first longitudinal portion (I) where the angle between the longitudinal axis (3) of the first longitudinal portion (I) and the rotational axis (8) of a rotor (9) carrying the rotor blade (1) in the operation amounts to 90°.

10. A wind energy plant (5) having a tower (6) and a nacelle (7) provided on the upper end of the tower (6), with a rotor (9), rotatably mounted around a rotational axis (8) and having at least one rotor hub (10), wherein at least one rotor blade (1) is arranged on the rotor hub (10), the rotor blade having a blade root (1a), with a first longitudinal portion (I) starting from the blade root (1a), with a second longitudinal portion (II), following up the first longitudinal portion (I) and running into a blade tip (2), with a first surface (S1), facing a tower (6) of the wind energy plant (5) in the assembled state, and a second surface (S2), facing away from the tower (6) of the wind energy plant (5) in the assembled state, wherein an imaginary reference plane (B) is spanned up by a rotation, taking place in the operation of the rotor blade (1), of the longitudinal axis (3) of the first longitudinal portion (I) around the rotational axis (8) of a rotor (9) of the wind energy plant (5) carrying the rotor blade (1), characterized in that the first surface (S1) runs along an imaginary cone plane (K) in the region of the second longitudinal portion (II), which is spanned up by a rotation, taking place in the operation, of the first surface (S1) in the region of the second longitudinal portion (II) around the rotational axis (8) of a rotor (9) carrying the rotor blade (1), wherein the cone plane (K) intersects the reference plane (B) in an angle of ($\alpha$), the distance (A) between the first surface (S1) and the reference plane (B) increases linearly in the direction towards the blade tip (2) along the second longitudinal portion (H), and the second longitudinal portion (II) is longer than the first longitudinal portion (I).

11. A wind energy plant according to claim 10, characterized in that the rotational axis (8) of the rotor (9) is at an angle ($\beta$) with respect to the horizontal (11).

* * * * *